June 10, 1958     D. WOODHEAD, JR     2,838,655
SWIVEL HOOK FOR LAMP GUARDS
Filed April 10, 1956
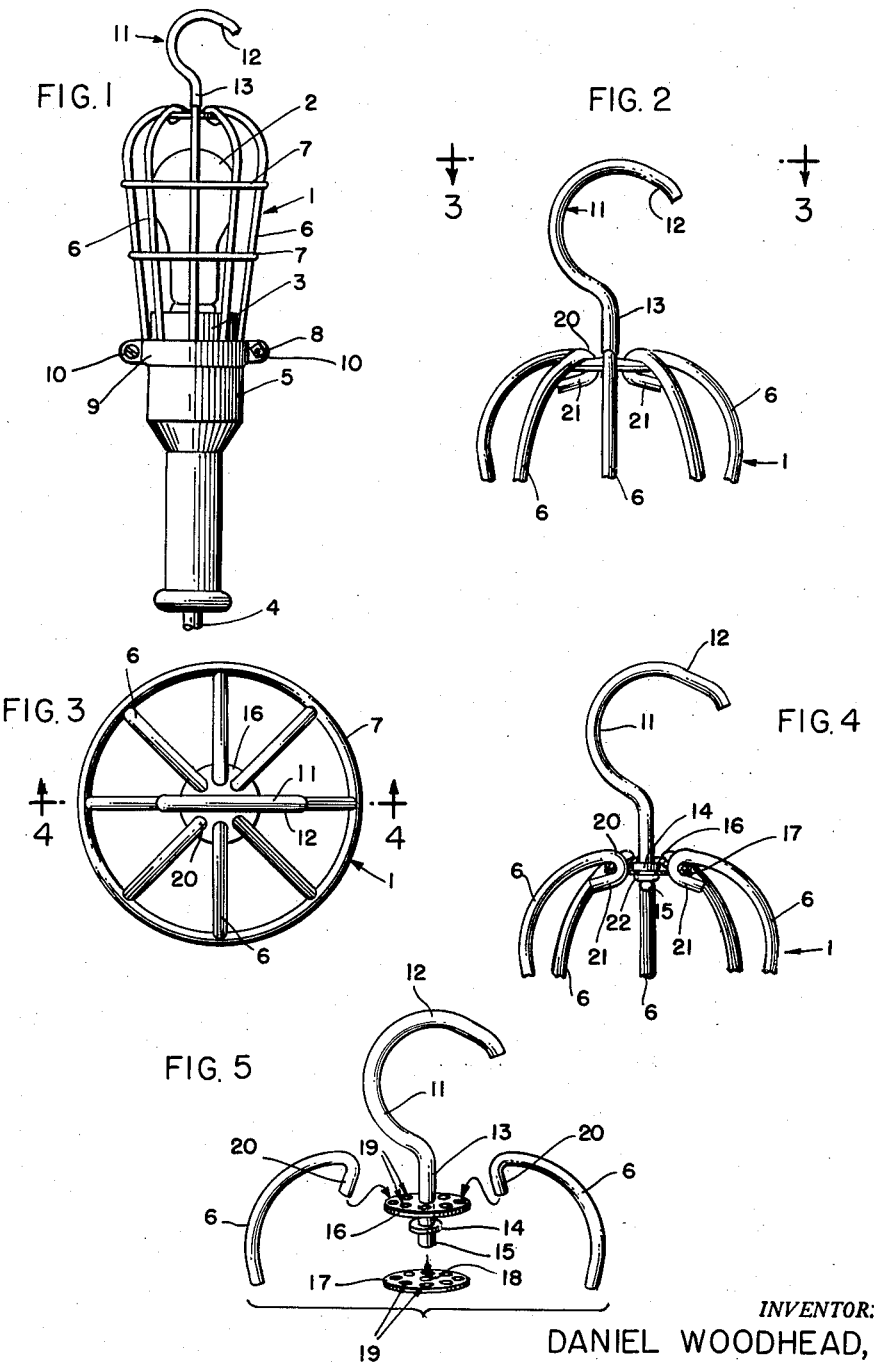
INVENTOR:
DANIEL WOODHEAD, JR.
BY
Marzall, Johnston, Cook & Root.
ATT'YS

United States Patent Office 2,838,655
Patented June 10, 1958

2,838,655

SWIVEL HOOK FOR LAMP GUARDS

Daniel Woodhead, Jr., Winnetka, Ill., assignor to Daniel Woodhead Company, Chicago, Ill., a corporation of Illinois Application April 10, 1956, Serial No. 577,214

6 Claims. (Cl. 240—54)

This invention relates to a lamp guard of the general type disclosed in United States Patents Nos. 2,265,830 and 2,703,838. More specifically, the invention relates to a lamp guard embodying a hook which passes through a centered disk, whereby the guard and its associated lamp socket and other appurtenances thereto may be hung and supported.

The invention comprises in general a hook for a lamp guard so constructed and arranged that the hook is swivelly mounted with respect to the lamp guard. The lamp guard is of the usual type and includes a plurality of vertically arranged circularly spaced apart wires which are suitably connected together, by welding or otherwise, to a plurality of horizontally connecting circular wires. The hook per se comprises a hook element having a hooked end for attaching the same to a bar or other structure, the hook terminating in a downwardly disposed stem. The stem is provided with an integral annular collar or member arranged between two disks. The disks are provided with annularly spaced alined holes through which the ends of the longitudinally extending wires pass, and are then bent over. The extreme lower end of the stem may be peened over against the lower end of the lower disk, whereby the disks will be held together, and the hook will be locked in position by means of the annular integral collar member, which is positioned between the two disks. The hook, therefore, is permitted to swivel with respect to the lamp guard, and the collar on the stem may be impinged between the disks for such swivel movement and still have a certain amount of friction to prevent looseness of the collar between the spaced disks. It is not necessary, however, that the extreme lower end of the stem of the hook be peened over against the outside surface of the lowermost disk, as the bent over longitudinal wires of the guard will sufficiently hold the disks together and permit swivel movement of the hook. It has been found desirable, however, that a peening operation be performed on the lower end of the hook's stem so as to take advantage, if there be any, of a certain amount of friction on the annular collar between the two disks. Also, the peening arrangement will hold the parts in position and prevent rattling in cases where the hook may be supported by an element which may have a certain amount of vibration.

The primary object of the present invention consists in the provision of new and improved means for securing a hook to a lamp guard or wire cage, so as to permit free swivel movement of the lamp guard or cage about the stem of the hook.

Another important object of the invention consists in the provision of a hook for a lamp guard, whereby the longitudinal wires of the lamp guard are threaded through alined holes in a pair of spaced apart disks, the hook having an annular collar secured to the stem thereof to prevent longitudinal movement of the hook with respect to the guard and permit swivelling or turning movement of the lamp guard about the hook.

A further object of the invention consists in the provision of an integral annular collar on the lower end of the stem of a hook, there being a disk spaced above the collar and another disk spaced below the collar to receive the annular collar therebetween, the disks being provided with circumferentially spaced alined holes through which the upper ends of the longitudinal wires of the guard or cage may pass, the upper ends of the wires being bent inwardly and outwardly from the disks.

Numerous other objects and advantages will be apparent throughout the progress of the specification which is to follow.

The accompanying drawing illustrates a certain selected embodiment of the invention and the views therein are as follows:

Fig. 1 is a detail elevational view of a lamp guard or cage and embodying the invention;

Fig. 2 is a detail enlarged view of the upper end of the lamp guard shown in Fig. 1;

Fig. 3 is a detail top plan view looking in the direction of the arrows 3—3 of Fig. 2;

Fig. 4 is a detail transverse sectional view on the line 4—4 of Fig. 3; and

Fig. 5 is a detail exploded view showing certain parts for swivelly mounting the hook to the lamp guard or cage.

The particular construction herein shown for the purpose of illustrating the present invention comprises a lamp guard or cage 1 which is arranged exteriorly about a lamp 2 to protect the same. The base of the lamp 2 is screw threaded into a socket receptacle 3 in the usual manner, and is electrically connected to electrical conductors arranged within a cable or sheath 4. The socket receptacle 3 may be mounted in a rubber or rubber-like handle 5 to which the lamp guard 1 may be attached.

The lamp guard or cage 1, as herein shown, is formed with a plurality of peripherally arranged vertical wires 6, and a plurality of transverse horizontally arranged encircling wires 7. The wires 6 and 7 are adapted to be secured together in any desirable means, such as by welding. The lower end of the guard or cage 1 may terminate into a ring 8 which may comprise two semi-circular parts 9. Each semi-circular part 9 has one-half of the vertical wires 6 welded thereto, whereby the guard may be spread apart to permit free and easy reception of the lamp 2. The two sections 9 of the ring 8 may be locked together by fastening means 10, such as nuts and bolts. The attachment of the attaching ring 8 at the lower end of the guard, and the construction of the ring 8 is disclosed in the aforesaid Patent No. 2,703,838. If desired, the two-part clamping ring may be of the type and kind disclosed in the other aforesaid patent, No. 2,265,830, in which the ring is indicated in said latter patent as a locking collar 14.

The lamp guard or cage 1 is connected at its upper end to a hook 11, and the manner of its attachment comprises the present invention. The hook 11 comprises a circular hook part 12 at its upper end to permit the lamp guard to be hung to a suitable support or supporting element. The lower end of the hook 11 terminates into an elongated lower stem or shank 13. An annular collar 14 is integrally formed near, or adjacent, the outer free end 15 of the stem 13, Figs. 4 and 5. An upper washer-like element or disk 16 is threaded over the hook 11, and is arranged above the annular integral collar 14. A second washer-like element or disk 17 is provided with a central opening 18 to receive the extreme lower end 15 of the stem part 13 of the hook 11. The disks 16 and 17 are provided with peripherally spaced openings 19, 19 which aline with each other and receive the upper ends 20 of the vertically arranged wires 6. The upper free ends 20 of the wires 6 pass through the alined holes in the disks 16 and 17 and then are bent over as indicated at 21, Figs. 2 and 4. The ends 20 of the wires 6, therefore, pass through the holes in the disks 16 and 17 and lock the integral annular collar 14 therebetween. The hook 11, therefore, is swivelly mounted with respect to the two disks, and inasmuch as the wires 6 of the cage 1 are secured to the two disks, the cage or guard 1 is swivelly supported to the hook 11.

If desired, the extreme lower free end 15 of the stem 13 of the hook 11 may be peened over as indicated at 22, Fig. 4. While it is not necessary that the peening 22 be performed, it is desirable to assist in maintaining the parts in secured position and to create a certain amount of friction on the collar 14 between the disks 16 and 17.

When the wires 6 are bent over as indicated at 21, Fig. 2, either one or both of the disks 16 and 17 may become somewhat deformed; that is, they may assume a substantially dish-shape form because of the bending over of the free ends of the wires 6, Fig. 4.

The invention provides for an extremely simple and inexpensive means for swivelly mounting and attaching a hook to a lamp guard or cage.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A lamp guard comprising a hook swivelly attached to the upper end thereof, a stem depending from said hook, an integral collar on the stem, an upper disk arranged above the collar and having spaced apertures, a lower disk arranged below the collar and having spaced apertures alining with the apertures in the upper disk, and vertical wires for the guard passing through the alined apertures of said disks and securing the collar between the disks.

2. A lamp guard comprising a pair of adjacently positioned upper and lower disks having alined central apertures and circumferentially arranged spaced alined holes arranged about the peripheries of said disks, a hook having a stem passing through said central apertures of the disks, a rigid collar on the stem arranged between said disks, and vertical wires for the guard having the upper ends of the wires passing through alined peripheral holes in said disks and bent inwardly beneath the lower of said disks and holding the disks together and impinging the collar between the disks.

3. A lamp guard having spaced vertical wires and circumferentially arranged horizontal wires connected thereto, a pair of upper and lower disks through which the upper ends of the vertical wires pass and turn inwardly beneath the lower disk, a hook having a stem passing through said disks, and a collar on said stem arranged between said disks and swivelly mounting the hook to the disks.

4. A lamp guard comprising circumferentially spaced vertical wires, a pair of disks arranged one above the other and having holes therein spaced peripherally thereabout with the holes in alinement with each other, the upper ends of the wires passing through the alined holes in the disks and bent inwardly beneath the lower disk, whereby the disks are secured to the vertical wires, said disks each having a central aperture therethrough, a stem passing through said apertures, a collar integral with said stem and arranged between said disks whereby the stem is swivelly mounted to the guard, and a hook on the upper end of the stem.

5. A hook swivelly mounted to a lamp guard comprising a stem having an enlarged collar integrally formed thereon adjacent its lower end, an upper disk arranged above the collar and having peripherally arranged apertures, a lower disk arranged below the collar and having peripherally arranged apertures in alinement with the apertures in the upper disk, and enclosing guard wires having the upper ends thereof passing through the alined apertures of said disks and clinched inwardly beneath the lower disk.

6. A hook swivelly mounted to a lamp guard comprising a stem having an enlarged collar integrally formed thereon adjacent its lower end, an upper disk arranged above the collar and having circumferentially arranged apertures, a lower disk arranged below the collar and having circumferentially arranged apertures in alinement with the apertures in the upper disk, and enclosing guard wires having the upper ends thereof passing through the alined apertures of said disks and clinched inwardly beneath the bottom of the lower disk, the extreme lower end of the stem being peened over against the bottom of the lower disk.

References Cited in the file of this patent

UNITED STATES PATENTS

| 1,843,418 | Ericson | Feb. 2, 1932 |
| 2,172,223 | Ribble | Sept. 5, 1939 |
| 2,292,620 | DiSapio | Aug. 11, 1942 |
| 2,694,776 | Wittman | Nov. 16, 1954 |
| 2,703,838 | Woodhead | Mar. 8, 1955 |